United States Patent [19]

Udovic

[11] 3,723,763

[45] Mar. 27, 1973

[54] QUASI-RMS MEASUREMENT CIRCUIT UTILIZING FIELD EFFECT TRANSISTOR AS A SWITCH

[75] Inventor: Daniel John Udovic, Hazlet, N.J.

[73] Assignee: Bell Telephone Laboratories, Incorporated, Murray Hill, N.J.

[22] Filed: Aug. 2, 1971

[21] Appl. No.: 168,311

[52] U.S. Cl. ..................307/229, 307/246, 307/251, 328/144

[51] Int. Cl. ..........................................H03k 17/00

[58] Field of Search ......328/144, 146, 151; 324/132; 307/246, 235, 230, 229, 251

[56] References Cited

UNITED STATES PATENTS

| | | | |
|---|---|---|---|
| 3,564,287 | 2/1971 | Todd | 307/246 X |
| 2,985,836 | 5/1961 | Hatton | 307/235 X |
| 2,834,883 | 5/1958 | Lukoff | 328/151 |

*Primary Examiner*—Herman Karl Saalbach
*Attorney*—R. J. Guenther et al.

[57] ABSTRACT

The quasi-rms value of a signal is measured by employing a passive network which includes a first resistor connected in series with a parallel connection of a second resistor and a capacitor. A signal to be measured is selectively applied to the first resistor of the passive network via a field effect transistor (FET) which is operated as a switch. The FET is controlled by a comparator which, in turn, is responsive to the signal being measured and the desired quasi-rms signal.

5 Claims, 2 Drawing Figures

QUASI-RMS MEASUREMENT CIRCUIT UTILIZING FIELD EFFECT TRANSISTOR AS A SWITCH

BACKGROUND OF THE INVENTION

This invention relates to measurement circuits and, more particularly, to circuits for measuring the quasi-rms value of a signal.

Techniques for measuring the quasi-rms value of a signal are now well known in the art and involve full wave rectification of the signal being measured. Heretofore, the rectified signal was supplied via a diode, which functions as a switch, to a passive network including a first resistor connected in series with a parallel connection of a second resistor and a capacitor. The potential developed across the capacitor represents the quasi-rms value of the applied full wave rectified signal. Such prior quasi-rms measurement circuits were found to be unsatisfactory because of variations in the switching diode characteristics.

Attempts have been made at minimizing the affects of such diode changes. For the most part, however, these attempts have resulted in complex circuit arrangements. One such circuit is described in U.S. Pat. No. 3,287,651 issued to J. F. Ingle on Nov. 22, 1966. Although the circuit described in U.S. Pat. No. 3,287,651 functions satisfactorily in certain applications, it is unsatisfactory for other applications because of circuit complexity and also because the quasi-rms output is not ground referenced.

SUMMARY OF THE INVENTION

These and other problems are overcome, in accordance with the inventive principles herein to be described, in a quasi-rms measurement circuit of the type including a first resistor connected in series with a parallel combination of a second resistor and a capacitor. A signal to be measured is controllably selectively applied to the first resistor of the series connection via a switching element. The switching element is controlled by a device responsive to the signal being measured and a signal developed across the capacitor, which represents the desired quasi-rms value.

More specifically, the quasi-rms value of a signal is measured, in accordance with the invention, by employing a field effect transistor (FET) as a switch, in combination with a comparator circuit to achieve "ideal" diode action. The comparator is responsive to the signal being measured and the quasi-rms output signal to generate a control signal which, in accordance with the invention, "drives" the FET into a saturated conductive state, i.e., ON, only when the magnitude of the signal being measured is greater than the amplitude of the quasi-rms output signal. The FET is driven into a nonconducting state, i.e., OFF, when the magnitude of the signal being measured is less than the amplitude of the quasi-rms output signal.

As is well known in the art, a field effect transistor (FET) when driven into saturation is essentially a resistor having a stable "low" resistance value. The resistance value of the conducting FET, is compensated by including it into the value of the first resistor of the quasi-rms series connection. Accordingly, a more precise measure of the quasi-rms value is obtained while greatly simplifying circuit design.

BRIEF DESCRIPTION OF THE DRAWING

These and other objects and advantages of the invention will be more fully understood from the following detailed description of an illustrative embodiment thereof taken in connection with the appended drawings wherein.

DETAILED DESCRIPTION OF THE INVENTION

The quasi-rms value of a signal is somewhere between the peak and average values of the signal, as is the rms value. As stated above, techniques for measuring the quasi-rms value of a signal are now well known in the art. A detailed discussion of quasi-rms measurement theory is found in an article entitled "A New Measuring Set for Message Circuit Noise" *Bell System Technical Journal*, July 1960, page 911, beginning at page 925.

Figure 1:
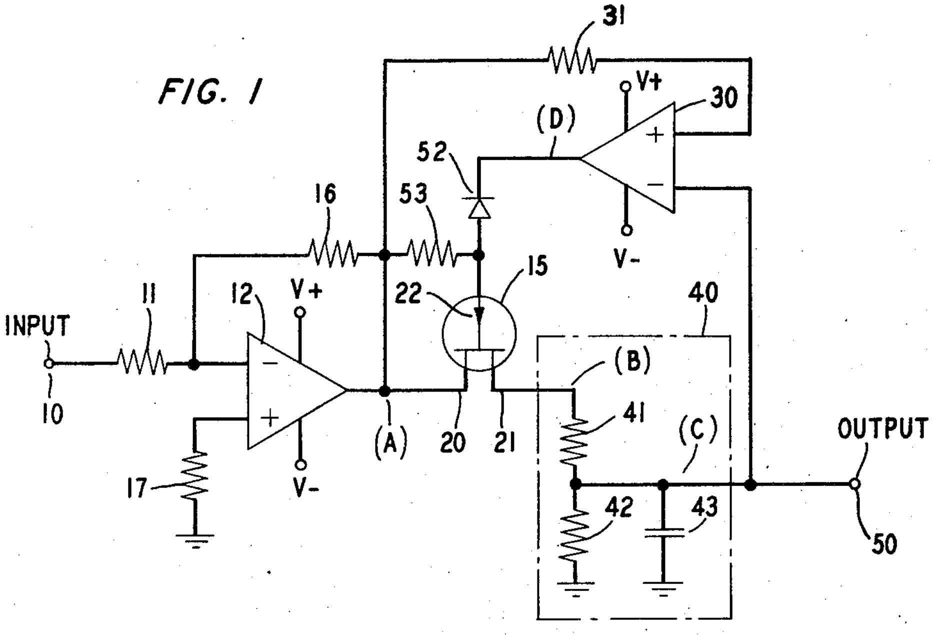
FIG. 1 is a schematic representation of a quasi-rms measurement circuit that illustrates the invention.
Figure 2:
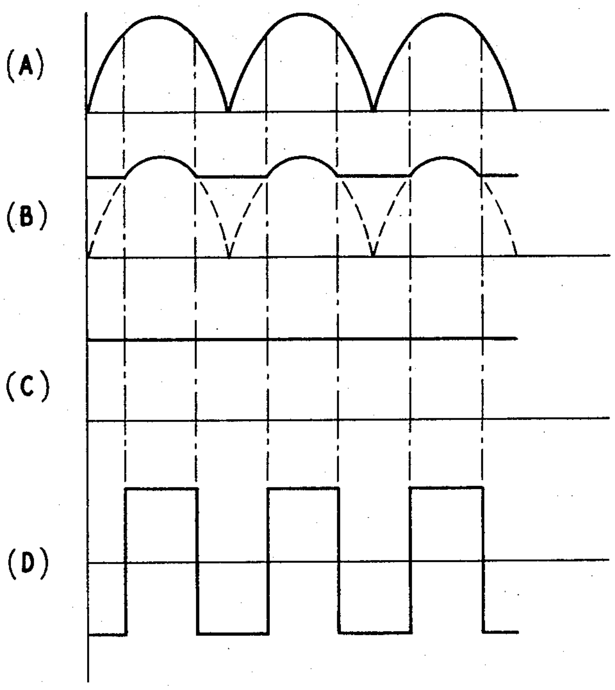
FIG. 2 shows waveforms useful in describing the invention shown in FIG. 1.

FIG. 1 illustrates a circuit for measuring the quasi-rms value of an applied signal in accordance with the invention. Waveforms of steady state signals developed in the circuit of FIG. 1 are shown in FIG. 2. The waveforms have been labelled to correspond to the points indicated in FIG. 1. Accordingly, a full wave rectified signal to be measured is supplied via input terminal 10 and resistor 11 to one input of amplifier 12. An inverted amplified version of the supplied signal is developed at the output of amplifier 12 as shown in waveform A of FIG. 2. Amplifier 12 is employed as a buffer to isolate input terminal 10 from field effect transistor (FET) 15 and to provide a low impedance signal source to facilitate proper switching of FET 15. Any one of numerous amplifiers known in the art may be utilized for this purpose. Preferably, amplifier 12 is constructed in integrated circuit form and is of an operational type well known in the art. Resistor 16 connected between the negative input and the output of amplifier 12 is employed in conjunction with resistor 11 to establish the gain of amplifier 12 in well-known fashion. Resistor 17 connected between the positive input of amplifier 12 and ground reference is utilized to stabilize d-c drift of amplifier 12, in a manner well known in the art.

The signal developed at the output of amplifier 12 is supplied to source terminal 20 of FET 15, and to the positive input of differential amplifier 30 via resistor 31. FET 15 operates as a controlled switch selectively to supply the output signal from amplifier 12 to passive network 40. The signal developed at drain terminal 21 of FET 15 is shown in waveform B of FIG. 2. Use of FET 15 as a controllable switching element, in accordance with the invention, yields improved precision in obtaining measurements of low signal levels and, in addition, yields a simplified circuit arrangement.

Network 40 includes resistor 41, resistor 42 and capacitor 43. The component values of resistor 41, resistor 42, and capacitor 43 are selected in accordance with preestablished criteria to obtain the desired quasi-rms measurements, as discussed in the *Bell System Technical Journal* article, cited above. A signal representing the desired quasi-rms of the signal being measured is developed across capacitor 43 and is shown in waveform C of FIG. 2. The quasi-rms signals is supplied to output terminal 50, where it is utilized as desired, and to the negative input of differential amplifier 30.

Differential amplifier 30 is utilized in an "open-loop" configuration and, therefore, operates as a comparator. Preferably amplifier 30 is also an operational type fabricated in integrated form. The signal developed at the output of amplifier 30, namely, waveform D of FIG. 2, is positive when the amplitude of the full wave rectified signal (waveform A, FIG. 2) is greater than the amplitude of the quasi-rms signal (waveform C of FIG. 2), and negative when the amplitude of the rectified signal is less than the amplitude of the quasi-rms signal. Thus, the quasi-rms output signal is utilized in accordance with the invention as a "self-established" reference signal for generating a signal to control FET 15. For this purpose, the control signal developed at point D of FIG. 1 is supplied via diode 52 to gate terminal 22 of FET 15. Diode 52 is poled to block the positive portion of the control signal from being supplied to gate 22 of FET 15. Resistor 53 connected between gate terminal 22 and source terminal 20 provides d-c bias for FET 15 in well-known fashion.

In this example, FET 15 is an N-channel type field effect transistor. Such a FET is in an ON state, i.e., in a saturated conductive state, when the potential applied between the source and the gate terminals is substantially zero, and is in an OFF state, i.e., nonconducting, when the potential applied between the gate and source terminals is of a sufficient negative amplitude. Therefore, in response to the signal developed at the output of amplifier 30, as shown in waveform D of FIG. 2, FET 15 is driven ON during the intervals when the control signal is positive, and is driven OFF during the intervals when the control signal is negative. Thus, the signal being measured is supplied to detector 40 only when its amplitude is greater than the quasi-rms signal developed across capacitor 43.

FET 15 in combination with differential amplifier 30 operates to yield substantially "ideal" diode action. That is to say, errors possible in prior art systems because of variations in diode characteristics are substantially eliminated in the present invention. Indeed, ideal diode action is substantially achieved, in accordance with the invention, because FET 15 when driven into a saturated conductive state is essentially a resistor. The ON resistance value of FET 15 is substantially constant and is compensated by adjusting the resistance value of resistor 41. That is to say, the resistance values of FET 15 and resistor 41 are combined. If the resistance value of resistor 41 is large as compared to the ON resistance of FET 15, then the resistance value of FET 15 may be ignored. In a particular embodiment of the invention not to be construed as limiting the scope of the invention, the resistance values of resistor 41 and FET 15 are 10.8 kilohms and approximately 25 ohms, respectively. Accordingly, in the above-described embodiment of the invention, the ON resistance of FET 15 may be neglected. Thus, a more precise quasi-rms measurement is obtained.

Representative values for the components and potentials for the circuit shown in FIG. 1, not to be construed as to limit the scope of the invention, are:

| | |
|---|---|
| Resistor 11 | 8.25 kilohms |
| Resistor 16 | 8.25 kilohms |
| Resistor 17 | 4.0 kilohms |
| Resistor 31 | 2.0 kilohms |
| Resistor 41 | 10.8 kilohms |
| Resistor 42 | 42.2 kilohms |
| Resistor 53 | 33 kilohms |
| Capacitor 43 | 4.7 microfarads |
| V+ | 15 volts |
| V– | 15 volts |

The above-described arrangements are, of course, merely illustrative of the principles of this invention. Numerous other arrangements may be devised by those skilled in the art without departing from the spirit or scope of the invention. For example, any of the numerous field effect devices known in the art may be employed as a switching element in the invention.

What is claimed is:

1. In a circuit for measuring the quasi-rms value of a signal of the type including a first resistor connected in series with a parallel combination of a second resistor and a capacitor, wherein the component values of the first and second resistors and the capacitor are determined in accordance with a pre-established criterion and wherein the potential developed across the capacitor represents the quasi-rms value being measured, characterized in that, comparator means in response to a first signal and a second signal representative of the potential development across the capacitor generates a control signal representative of intervals when the magnitude of said first signal is greater and less than the amplitude of said second signal, and a field effect transistor having source, gate and drain terminals, said drain terminal being in circuit with said first resistor, said gate terminal being in circuit relationship with said comparator means, and said first signal being supplied to said source terminal, wherein said field effect transistor responds to said control signal for selectively applying said first signal to said first resistor only during intervals when the magnitude of said first signal is greater than the amplitude of said second signal.

2. A circuit as defined in claim 1 wherein said comparator means is a differential amplifier having first and second inputs and an output, said output being in circuit relationship with the gate terminal of said field effect transistor, said first signal being supplied to said first input and said second signal being supplied to said second input for generating at the output of said differential amplifier a control signal having a first polarity when the magnitude of said first signal is greater than the amplitude of said second signal and having a second polarity when the magnitude of said first signal is less than the amplitude of said second signal for gating said field effect transistor ON and OFF, respectively, selectively to apply said first signal to said first resistor.

3. A circuit as defined in claim 2 further including amplifier means having an input and an output, said output being in circuit relationship with said source terminal of said field effect transistor and said first signal being supplied to the input of said amplifier means.

4. A circuit for measuring the quasi-rms value of a full wave rectified signal which comprises, network means including a first resistor, a second resistor and a capacitor, said first resistor being serially connected with a parallel connection of said second resistor and said capacitor, differential amplifier means having first and second inputs and an output, said amplifier means being responsive to a full wave rectified signal supplied to said first input and a signal developed across said capacitor supplied to said second input for generating a control signal at said output having a predetermined amplitude and a first polarity when the amplitude of said full wave rectified signal is greater than the amplitude of the signal developed across said capacitor and a second polarity when the amplitude of said full wave rectified signal is less than the amplitude of the signal developed across said capacitor, and controllable switching means in circuit relationship with the first resistor of said network means and the output of said differential amplifier means, said switching means being responsive to said control signal for applying said rectified signal to said network means only during intervals of said control signal having said first polarity.

5. A circuit as defined in claim 4 wherein said controllable switching means includes a field effect transistor having source, gate and drain terminals, said drain terminal being in circuit with said first resistor of said network means, said gate terminal being in circuit relationship with the output of said differential amplifier and wherein said field effect transistor is responsive to said control signal developed at the output of said differential amplifier for applying a full wave rectified signal supplied to said source terminal to said first resistor only during intervals of said control signal having said first polarity.

6. A circuit for measuring the quasi-rms value of a signal, which comprises, a first resistor, a second resistor, a capacitor, said capacitor being connected in parallel with said second resistor, said parallel connection having first and second ends, said first resistor being connected in series with said first end of said parallel connection and the second end of said parallel connection being connected to a reference potential point, a differential amplifier having first and second inputs and an output, a full wave rectified signal to be measured being supplied to said first input and a signal developed across said capacitor being supplied to said second input so that a control signal having a predetermined amplitude is developed at the output of said differential amplifier having a first polarity for intervals when the amplitude of said rectified signal is greater than the amplitude of the signal developed across said capacitor and a second polarity for intervals when the amplitude of said rectified signal is less than the amplitude of the signal developed across said capacitor, a field effect transistor having source, gate and drain terminals, said drain terminal being connected in series with said first resistor, a third resistor connected between said gate terminal and said source terminal of said field effect transistor, and a diode being connected between the output of said differential amplifier and the gate terminal of said field effect transistor, said diode being poled to pass only the intervals of said control signal having said second polarity to the gate terminal of said field effect transistor, whereby said field effect transistor is biased into a nonconductive state during intervals of said control signal having said second polarity and is biased into a conductive state during intervals of said control signal having said first polarity.

* * * * *

Disclaimer 3,723,763.—*Daniel John Udovic*, Holmdel, N.J. QUASI-RMS MEASUREMENT CIRCUIT UTILIZING FIELD EFFECT TRANSISTOR AS A SWITCH. Patent dated Mar. 27, 1973. Disclaimer filed July 16, 1973, by the assignee, *Bell Telephone Laboratories, Incorporated.*

Hereby enters this disclaimer to all claims of said patent.

[*Official Gazette November 6, 1973.*]